Oct. 11, 1927.
E. D. BROWN
1,645,125
BRAKE MECHANISM FOR VEHICLES
Filed Feb. 15, 1927
5 Sheets-Sheet 4
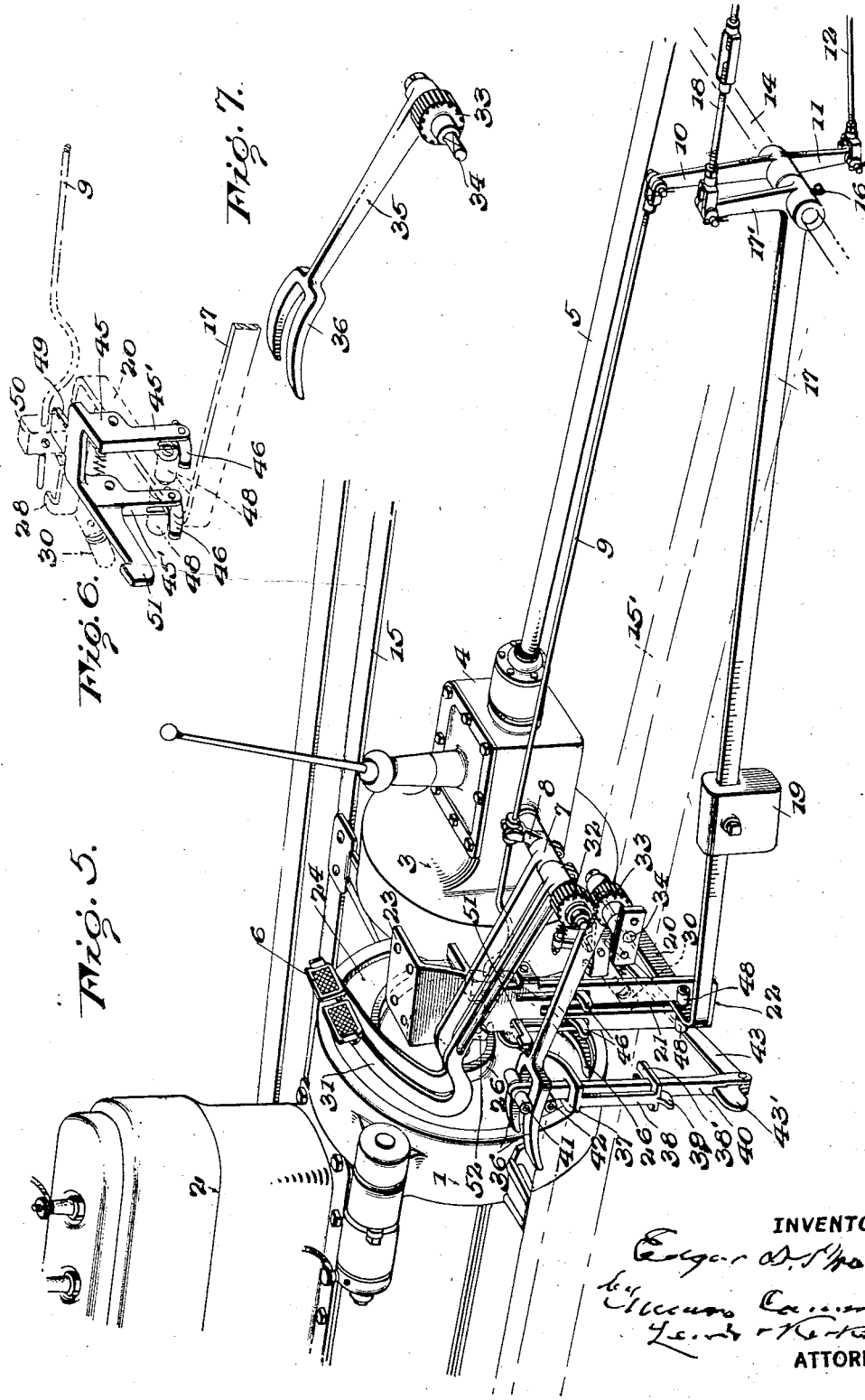
INVENTOR
Edgar D. Brown
ATTORNEYS Oct. 11, 1927.
E. D. BROWN
1,645,125
BRAKE MECHANISM FOR VEHICLES
Filed Feb. 15, 1927    5 Sheets-Sheet 5
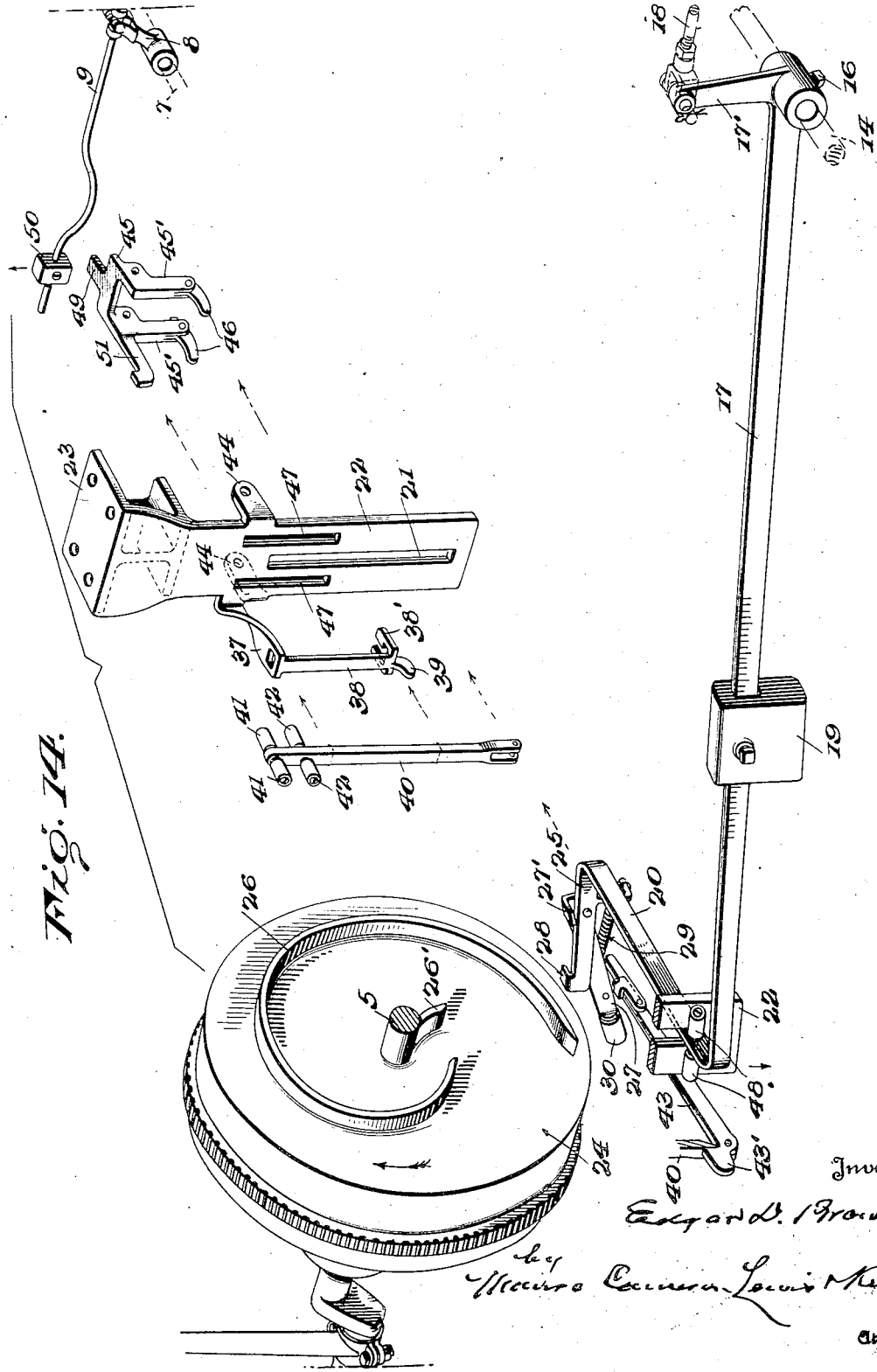

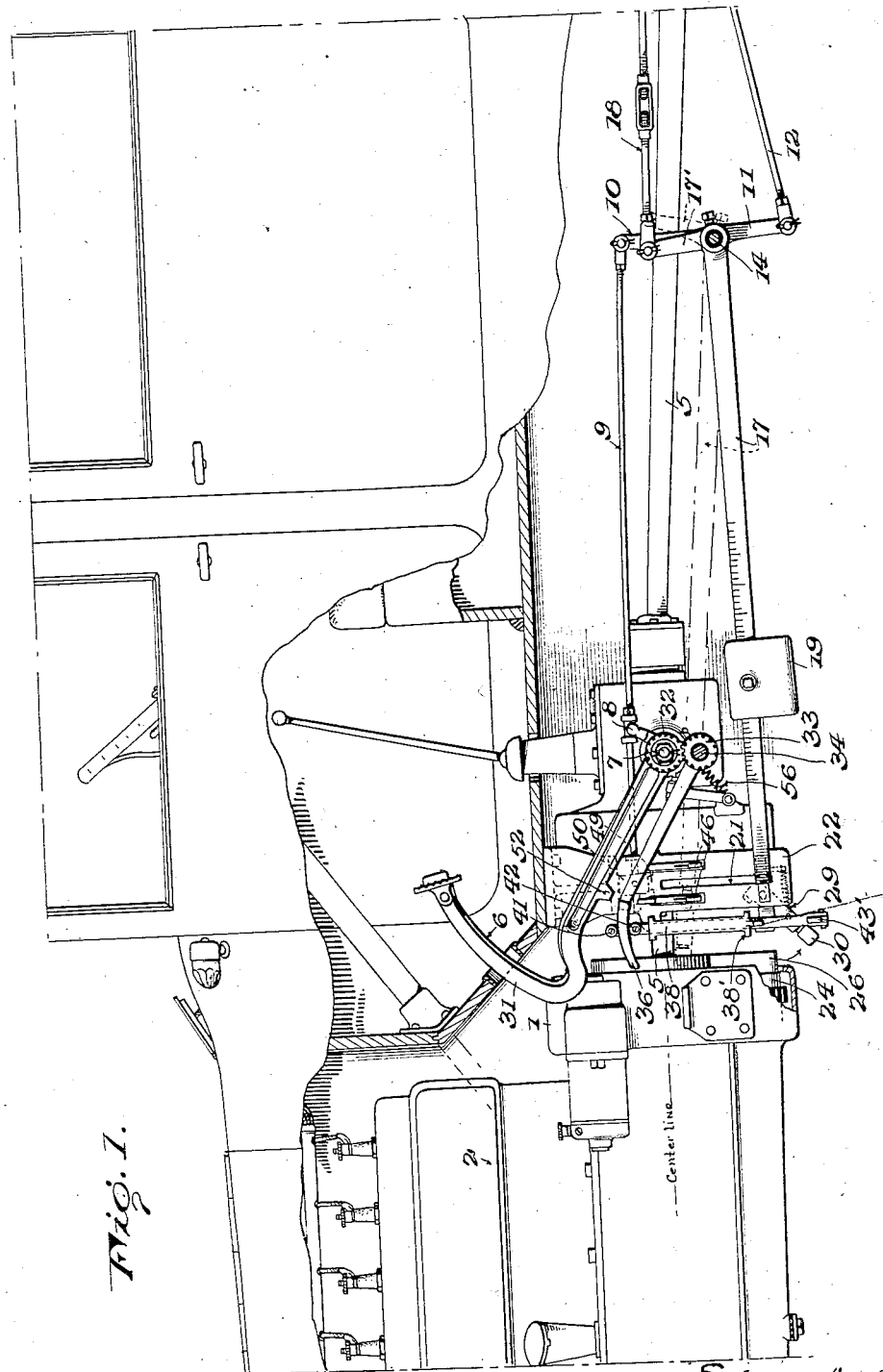

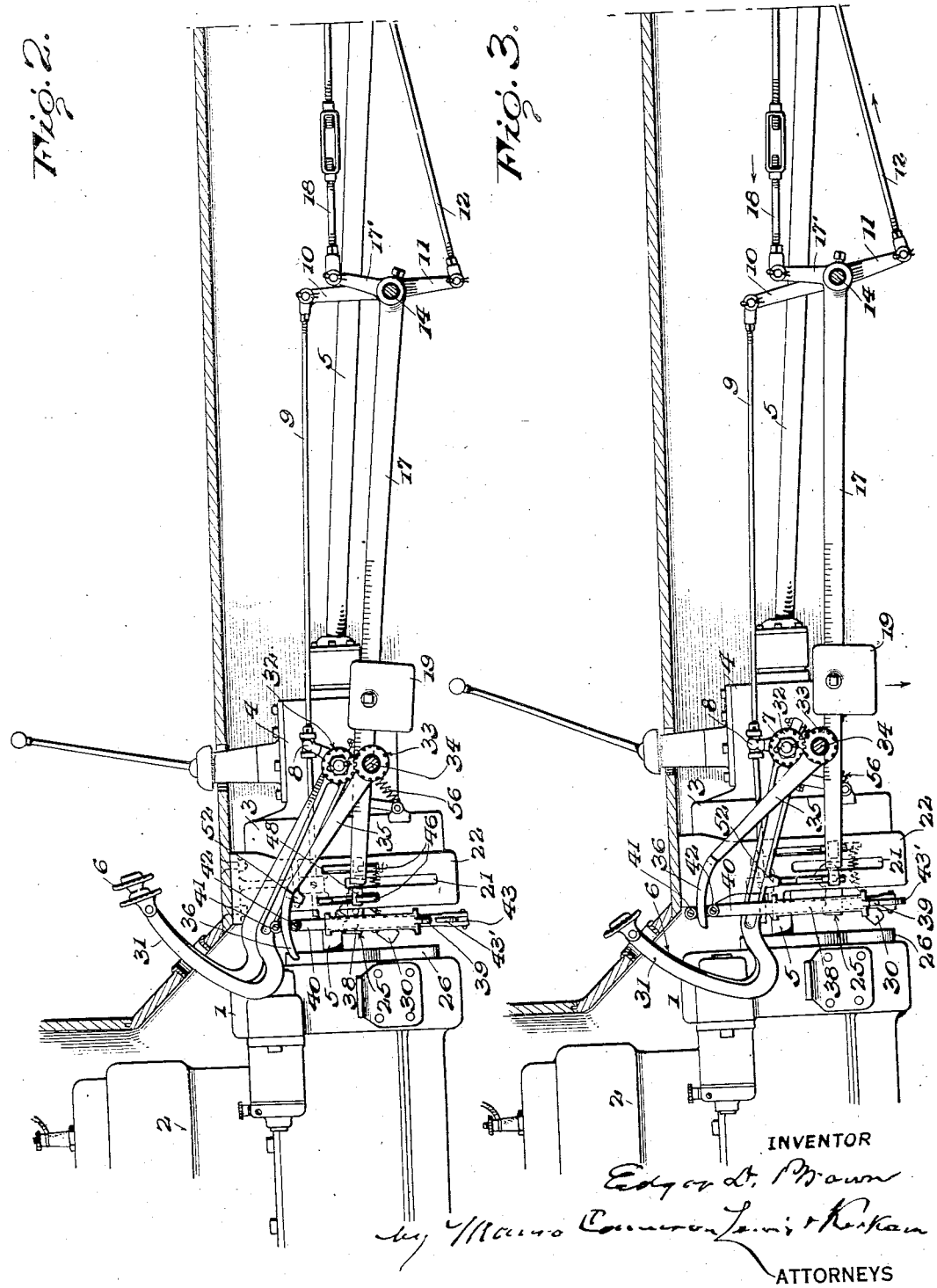

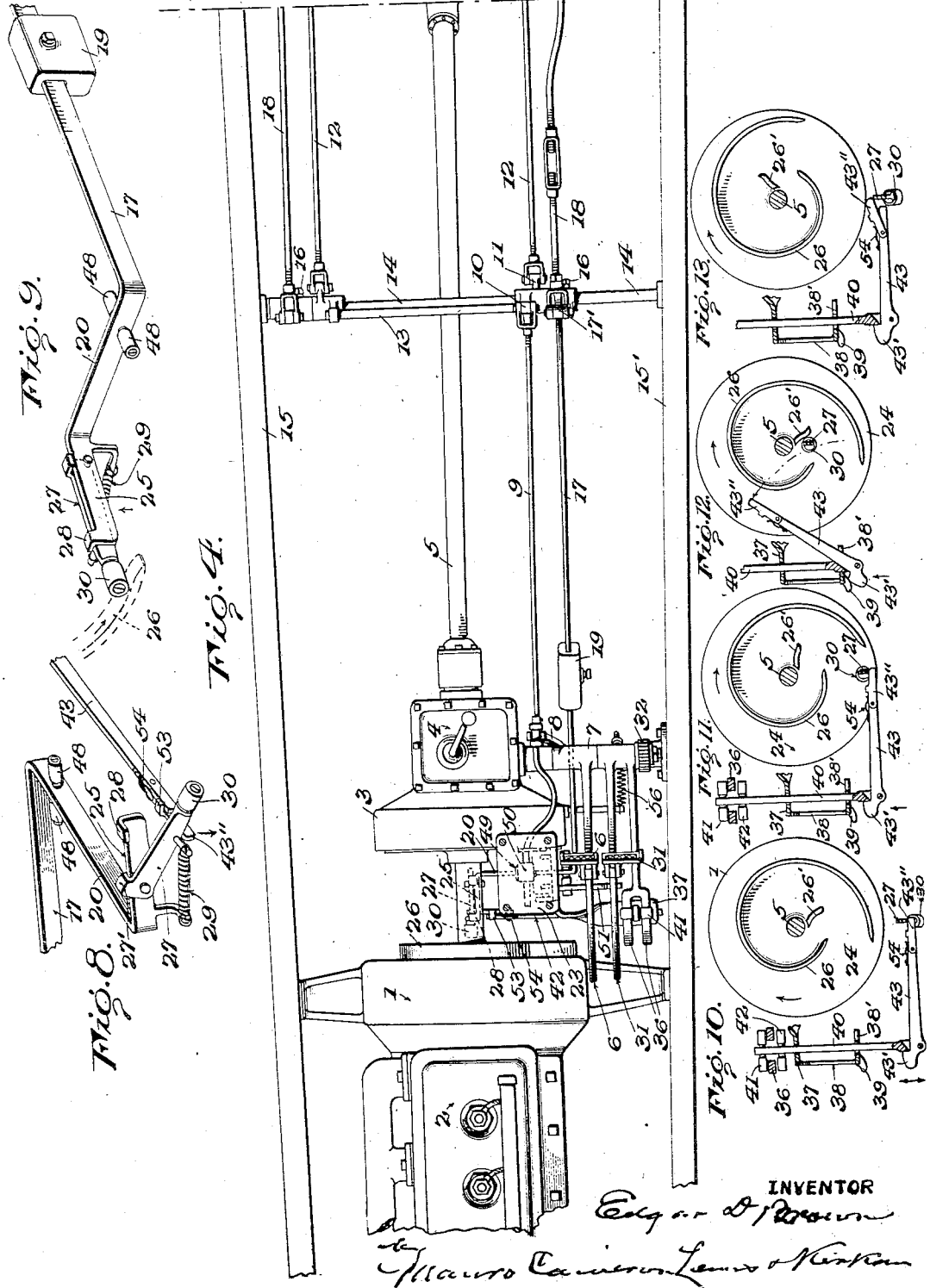

Patented Oct. 11, 1927.

1,645,125

UNITED STATES PATENT OFFICE.

EDGAR D. BROWN, OF POTTSVILLE, PENNSYLVANIA.

BRAKE MECHANISM FOR VEHICLES.

Application filed February 15, 1927. Serial No. 168,410.

This invention relates to brake mechanism for vehicles, such as automobiles and the like, and has for one of its objects to provide a power actuated emergency brake mechanism by which the brakes may be automatically applied without the necessity of the manipulation of an emergency brake lever by the operator.

A further object is to provide a power actuated emergency brake under the control of the clutch lever and a foot brake under the control of the foot brake lever, each of which levers shall perform their normal functions of clutch and foot brake control without effecting the application of the emergency brake, such application, however, being possible when and only when both of said levers are thrown to a predetermined position.
A still further object of the invention is to combine said power actuated emergency brake with power means, preferably that of the vehicle itself, for releasing the brakes. Preferably this is accomplished by operatively connecting, at will, the emergency brake with the flywheel of the engine, whereby the emergency brake is thrown into release position and retained in such position until another application thereof is desired.
Another and further object of the invention is to provide means whereby the vehicle cannot be started without first releasing the emergency brake. Preferably this is accomplished through the clutch lever of the automobile and so combining this clutch lever with the release mechanism that the emergency brake is released by an initial depression of the clutch lever, whereby the clutch is thrown out of operation.
Still further objects of the invention will appear as the description thereof proceeds.

The inventive idea is capable of being embodied in a variety of mechanical structures, one of which, for the purpose of illustrating the invention, is shown in the accompanying drawings, but it will be expressly understood that such drawings are for the purpose of illustration only and are not designed to define the limits of the invention, reference being had to the appended claims for this purpose.

In said drawings—

Fig. 1 is a broken, side elevation of an automobile showing the invention applied thereto with the emergency brake applied;

Fig. 2 is a like view with the emergency brake off, the parts being in the position they occupy at the initial depression of the clutch lever;

Fig. 3 is a side view similar to Figs. 1 and 2, showing the parts in the position which they occupy when the emergency brake is going on, but before the same is fully applied;

Fig. 4 is a plan view of the brake mechanism shown in Fig. 1 with the emergency brake on;

Fig. 5 is a perspective view with the parts in the position they occupy when the emergency brake is applied;

Fig. 6 is a detail perspective of the mechanism for holding the brakes in released position;

Fig. 7 is a perspective view of the element actuated by the clutch lever for throwing the parts into operative relation with the flywheel of the engine to elevate the emergency brake lever and release the brakes;

Fig. 8 is a detail perspective view of the end of the emergency brake lever illustrating the mechanism whereby the latter is thrown into operative relation with the flywheel; said view being taken from the position looking in from the top of Fig. 4;

Fig. 9 is a perspective view of the parts shown in Fig. 8 but with the elements in the position in which they occupy when engaged with the cam;

Figs. 10, 11, 12 and 13 are diagrammatic elevations illustrating the action of the brake releasing mechanism, and Fig. 14 is an exploded view in perspective of the several elements of the device, parts being separated in order to enable the construction and combination thereof to be more readily understood;

Referring to the drawings in which like reference numerals indicate like parts throughout the several views, 1 is the flywheel casing of the engine 2, 3 indicates the clutch, 4 the transmission casing and 5 the drive shaft, all of which may be of the usual or any suitable construction. 6 is any suitable foot brake lever having a sleeve 7 integral therewith and turning on a shaft supported between the transmission casing 4 and the side frame 15', which sleeve has projecting therefrom a radial lever 8 secured in any suitable way to the foot brake rod 9, connected to the upper lever arm 10, the lever arm 11 of which has secured thereto the usual foot brake rod 12, Fig. 5. There are two such rods 12, one on either side of the machine, and two of the levers 10—11, which are connected together by the rod 13, Fig. 4, whereby the brakes on either side of the machine are operated in unison through the foot lever 6 and the rod 9. The levers 10—11 are fulcrumed on a shaft 14 extending across and free to turn in bearings in the side frame 15, 15'.
Secured to the shaft 14, as by a set screw 16, is a bell crank lever, one arm, 17, of which extends forward from the shaft 14 into proximity with the brake and clutch levers and the flywheel of the motor. The other arm, 17', of said lever has an emergency brake rod 18 connected thereto. By rocking the bell crank lever 17—17' the emergency brake rod 18 may be actuated either to set or release the brakes. Carried on the lever arm 17 is a weight 19 adjustably secured in position thereon, which weight, when the emergency brake is applied, acts in combination with the lever 17—17' as a power device to set the brake. This is the position of the parts shown in Figs. 1 and 5. For the purpose of releasing the brakes, power means are provided whereby the lever arm 17, together with its supported weight 19, is elevated. Such power means is, in the form of the invention shown in the drawings, the automobile engine itself, and mechanism is provided whereby, when it is desired to release the emergency brake, the lever arm 17 is thrown into operative relation with the flywheel of the automobile engine, to raise said arm.

Referring now to Figs. 5, 8, 9 and 14, the lever arm 17 has a part 20 thrown inwardly at right angles through a slot 21 formed in a plate 22 secured, as at 23, in any suitable way to the frame of the machine. The part 20 extends to a point approximately under the motor shaft on which the flywheel 24 is secured, and is then bent again at right angles so as to have a part 25 extending forward toward and in close proximity to the face of the flywheel 24, on which face is provided a cam 26, see Figs. 4 and 10 to 14. Pivoted to the part 25 is a finger 27, which finger has a lip 27' projecting over the top of the part 25, whereby the movement of the finger 27 on its pivot is limited in the upward direction as well as in a downward direction, and preferably a shoulder 28 projects from the side of the part 25 at the end thereof, also acting as a limiting stop to the upward movement of the finger 27, said finger being held in the depressed position shown in Fig. 8 by spring 29. This finger 27 is shown in its lower position in Figs. 8 and 14 and in its upper position in Fig. 9. The finger 27 is provided on its outer end with a roller 30.

Referring now to Figure 4, the roller 30, when the parts are in the position shown in Fig. 8, just clears the cam 26 on the flywheel. If the finger 27 is raised in the position shown in Fig. 9, the roller 30 is thrown into the path of the cam 26, and the roller, and with it the end of the lever arm 17 to which it is attached, is elevated by the cam to a position just under the shaft 5, and when the roller 30 leaves the inner end of the cam, the spring 29 preferably in conjunction with a lug 26' on the face of the flywheel, will depress the finger 27 from the position shown in Fig. 9 to the position shown in Fig. 8, thereby withdrawing the roller 30 from the path of the cam.

The means for elevating the finger 27 so as to bring the roller 30 into operative relation with the cam 26 will now be described. The clutch lever 31 is mounted to turn on the same shaft as the brake lever 6, and has a gear wheel 32 secured thereto and turning therewith on the same shaft. This meshes with another gear 33 on a stubshaft 34 secured in any suitable manner to and projecting inward from the frame of the machine. This gear 33 has rigidly secured thereto and operated thereby a lever arm 35 having a fork 36 at its outer end. The plate 22 is provided with an outwardly extending bracket 37 which has a downwardly projecting arm 38 supporting an inwardly extending slotted bracket 38', which has a lug 39 thereon. Sliding vertically through an opening in the bracket 37 and the slotted bracket 38' is a bar 40 having a pair of rollers 41 engaging the upper surface of the fork 36, and a pair of rollers 42 engaging the lower surface of said fork, said fork and rollers being situated above the bracket 37. The bar 40 projects down below the bracket 38' and has a lever 43 pivoted on its lower end, the long arm of the lever extending inward under the finger 27, while the short arm 43' of the lever extends to the outside of the bar 40 and in the same vertical plane as the lug 39 on the bracket 38'. A slight downward depression of the clutch lever 31 operates through the gears 32 and 33 to elevate the fork 36 and with it the bar 40 and lever 43 (see Fig. 11). A further depression of the clutch lever brings the short arm 43' of the lever 43 into engagement with the lug 39, thereby giving the arm 43 a quick upward thrust (see Fig. 12). Since this arm 43 extends under the finger 27, see Fig. 8, a slight depression of the clutch lever elevates the finger 27 into the position shown in Figs. 9 and 11, where it is engaged by cam 26, by which the lever arm 17 is raised, thus releasing the brakes. When the downward pressure on the clutch lever 31 is released, the fork 36, and the parts connected thereto drop to the position shown in Figs. 5 and 10.

For retaining the lever arm 17 in the elevated position, and thus retaining the emergency brake released, means are provided for engaging the arm in the elevated position, to the end that when the roller 30 passes from the cam 26 the lever arm 17 may be held elevated. This retaining means is illustrated in detail in Figs. 6 and 14.

Referring to Fig. 14, the plate 22 has two rearwardly extending lugs 44, between which there is pivoted a pawl frame 45. This pawl frame is provided with two downwardly projecting arms 45', and on the lower end of these arms are provided two pawls 46 which project through slots 47 in the plate 22 and into the path of the rollers 48 projecting from the sides of the inwardly extending arm 20 of the lever 17. These pawls 46 are pivoted so that they freely turn vertically upward when struck on the lower side thereof by the rollers 48 and when the rollers have passed the same, the pawls drop into the position shown in Figs. 5, 6 and 14. This occurs just before the roller 30 passes from the cam 26, and as the arm 17 is released from the sustaining influence of the cam it is caught and retained by the pawls 46, as clearly shown in Fig. 6. The frame 45 has a rearwardly projecting shelf-like arm 49, Figs. 6 and 14, and the foot brake bar 9 projects forward over said arm and has an interrupter block 50 secured thereon in such position as to rest just over the arm 49, the arm and the interrupter block being so proportioned that some considerable longitudinal movement of the foot brake rod 9 is essential to move the block off of the arm (see Fig. 6). During the ordinary application of the foot brakes, the block 50 is not released from engagement with the arm 49, complete disengagement occurring only when the foot brake lever 6 is fully depressed, at which time the block 50 will be thrown sufficiently forward to entirely disengage the block 50 and the arm 49. The frame 45 is provided with an arm 51 projecting through one of the slots 47 in the plate 22, and has an upwardly turned nose directly in the path of a lug 52, Fig. 5, on the under side of the clutch lever 31. If the interrupter block 50 is out of engagement with the arm 49 and the lug 52 comes in contact with the arm 51 on the frame 45, it will rock the frame on its pivot, thereby withdrawing the pawls 46, 46 from beneath the rollers 48 on the emergency lever arm 17. This rocking action can only occur when the foot brake lever 6 is fully depressed and the interrupter block 50 removed from the shelf-like arm 49. It will thus be apparent that in order to apply the emergency brake, both the foot brake lever and the clutch lever must be fully depressed. Any intermediate action of either of these levers either singly or together cannot effect the tripping of the pawls which support the emergency brake lever.

Referring now to Fig. 5, it will be seen that the weighted brake lever arm 17 is in its lowermost position. In this position of the parts, the brakes are applied and the finger 27 is in the depressed position shown in Fig. 8 and the roller 30 out of the path of the cam 26. If now the clutch lever 31 is slightly depressed, as shown in Fig. 2, the fork 36 will be elevated by reason of the intermeshing of the gears 32 and 33 so as to raise the bar 40 and with it the lever 43 from the position shown in Figs. 1 and 10 to the position shown in Figs. 2 and 11, and since the lever 43 engages the underside of the finger 27, said finger will be raised from the position shown in Fig. 8 to that shown in Fig. 9, thereby bringing it within the path of the cam 26. The cam operates to lift the finger and with it the brake lever 17, and as it moves upward the rollers 48 strike the underside of the pawls 46, which yield in an upward direction and permit the rollers to pass, when the pawls again drop in the position shown in Fig. 5. At this point, the roller 30 passes off of the cam 26 and the rollers 48 drop onto the pawls 46, as indicated in dotted lines in Fig. 6. This operates to hold the brake lever 17 in its elevated position and the emergency brake released.

As indicated above, the frame 45 cannot be tilted on its pivot to withdraw the pawls 46 from beneath the rollers 48 as long as the interrupter block 50 is over the bracket arm 49 of the tilting frame 45. If the foot brake lever 6 is fully depressed, the brake rod 9 will be thrown forward, thereby thrusting the interrupter block 50 off of the brake arm 49; then if the clutch lever 31 is fully depressed, the lug 52 on the under side of said lever will engage the arm 51 of the frame 45, rocking it on its pivot and withdrawing the pawls from beneath the rollers 48, thereby permitting the brake lever arm 17 to fall and apply the brake.

The initial depression of the clutch lever, as before described, operates to elevate the lever 43 from the position shown in Fig. 10 to that of Fig. 11. If the brake is "on" this raising of lever 43 lifts finger 27 to bring roller 30 in the path of the cam 26. But if the brake is "off" the lever 17 is held in the elevated position, Fig. 2, with the roller 30 out of the path of the cam. Now full depression of the clutch lever 31 to the position shown in Fig. 3 will operate to raise the lever 43 not only to the position shown in Fig. 11, but, by reason of the engagement of the short arm 43' of the lever 43 with the lug 39, will sharply throw the lever 43 from the position shown in Fig. 11 to that shown in Fig. 12, and in its upward movement it will just clear the finger 27, see Fig. 12. This full depression of clutch lever 31 trips pawls 46 and permits the lever arm 17, and with it the finger 27 and its roller 30, to drop to the lowermost position shown in Fig. 1. When the clutch lever 31 is released and is returned by the clutch lever spring 56 to the normal position shown in Figs. 1 and 5, the fork 36, the bar 40, and the lever 43 move downward to the position shown in Fig. 5. At this time, however, the brake lever 17 and the finger 27 have been returned to their lowermost position and the finger 27 is in the downward path of the lever 43. In order to enable the lever to pass the finger 27 and resume its position under said finger, as shown in Figs. 8, 10 and 11, the lever 43 is provided with a nose end 43″ pivoted thereto so as to be free to break in an upward direction but not to break in a downward direction. This result is secured by providing a lug 53, Fig. 8, on the pivot nose end 43″, which lug extends over the top of the lever 43 between the pivot point of the nose end 43″ and the end of said lever. When the lever 43 descends from the position shown in Fig. 12 to the position shown in Fig. 13, the nose 43″ strikes the finger 27, as shown in Fig. 13, and is broken upward, and permits the lever 43 to pass below the finger 27. As soon as the nose 43″ has passed the finger 27, it is again thrown into position under said lever by spring 54. The parts will then be in the position shown in Figs. 8 and 10 with the brake applied.

To release the brake, it is only necessary to slightly depress the clutch lever 31, see Fig. 2, which will act to raise the roller 30 from the position shown in Fig. 8 to the position shown in Fig. 9, when the cam 26 will again operate on the roller 30 to lift the lever 17.

From the foregoing, it will be seen that there is provided by the invention an automatically operated power device for applying the brake, which device, however, cannot be operated without first opening the clutch; that the brake may be thus applied while the engine remains running and the clutch open; that the brake may be released by the application of the power of the automobile engine, it being necessary, however, before initiating the release of the brake to open the clutch; and that all of the operations are under the control of the ordinary foot brake and clutch levers, thereby entirely eliminating the emergency brake lever heretofore in common use.

It will be readily understood by those skilled in the art that the inventive idea is not limited to the illustrative embodiment thereof shown and described in detail herein, since various modifications may be effected without departing from the broad inventive idea. The scope of the invention therefore is not to be limited to the specific embodiment herein shown and described or otherwise than by the terms of the appended claims.

What is claimed is:

1. A brake for automobiles or the like, comprising a brake, a weighted lever operatively connected to said brake, means holding said lever in elevated position, and a clutch lever in operative relation with said holding means, whereby the said lever is released and the brake applied.

2. In an automobile, the combination of a foot brake and an emergency brake, with a foot brake lever for applying the foot brake, a weighted lever operatively connected to the emergency brake for applying the same, means normally holding said weighted lever in non-brake-applying position, a control device for said holding means, operative connections between said foot brake lever and said control device, and operative connection between said holding means and said clutch lever.

3. In an automobile, the combination of an emergency brake, a clutch lever, a weighted lever connected to said brake to apply the same, a motor, and clutch-lever-operated means for connecting said motor and weighted lever to release the brake.

4. In an automobile, the combination of a brake, a weighted lever whereby the brake is applied, a motor-driven cam, a clutch lever, and clutch-lever-actuated means for connecting said weighted lever and cam to release the brake.

5. In an automobile, the combination of a brake, a weighted lever connected thereto, a motor-driven cam, manually operated means for connecting said lever and cam whereby said lever is elevated, means automatically disconnecting the same with the lever in elevated position, a lever-engaging device for holding the same elevated, and means actuating said device to release said lever.

6. In an automobile, the combination of a brake, a weighted lever connected thereto and operating when in depressed position to apply the brake, means actuated by the automobile engine to raise said lever and release the brake, a retaining device for engaging said lever in raised position, and a clutch lever in operative relation with said device to trip the same to apply the brake.

7. In an automobile, the combination of a brake, a weighted lever connected thereto and operating when in depressed position to apply the brake, a flywheel, a cam on the flywheel, means under the control of the operator for connecting said cam and lever to raise the latter and release the brake, a retaining device for engaging said lever in raised position, and a clutch lever in operative relation with said device to trip the same to apply the brake.

8. In an automobile, the combination of a brake, a weighted lever operatively connected thereto, a motor-driven cam, a clutch lever, means actuated by said clutch lever in one position to throw said cam and weighted lever into operative relation, whereby the weighted lever is actuated to release the brake, a retaining device engaging the weighted lever when in release position, and means actuated by said clutch lever in another position to trip said device to apply the brake.

9. In an automobile, the combination of a foot brake and a lever for controlling the same, with a power actuated emergency brake, and a clutch lever controlling the application and release of said emergency brake.

10. In an automobile, the combination of a power actuated emergency brake, a clutch lever controlling the application and release of the same, with a foot brake, a foot brake-operating lever, and means operated by said foot brake lever and controlling the application of the emergency brake.

11. In an automobile, the combination of an emergency brake, and a foot brake, with a foot brake lever, a clutch lever, and a power device for applying the emergency brake, said power device being subject to the dual control of said foot brake lever and said clutch lever.

12. In an automobile, the combination of a brake, a clutch, a power device for releasing the brake, and a clutch lever controlling the clutch and the application of said power device to said brake.

13. In an automobile, the combination of a clutch, a brake, a power device for applying the brake, a power device for releasing the brake, and a lever controlling said clutch and the application of each of said power devices.

In testimony whereof I have signed this specification.

EDGAR D. BROWN.